United States Patent [19]

Paladini

[11] 4,252,908
[45] Feb. 24, 1981

[54] PROCESS FOR THE PREPARATION OF PHENOL-FORMALDEHYDE FOAMS

[75] Inventor: Jean-Claude Paladini, Souchez, France

[73] Assignee: Societe Chemique des Charbonnages, Paris, France

[21] Appl. No.: 41,073

[22] Filed: May 21, 1979

Related U.S. Application Data

[63] Continuation of Ser. No. 899,822, Apr. 25, 1978, abandoned.

[30] Foreign Application Priority Data

Apr. 26, 1977 [FR] France .............................. 77 12559
May 17, 1977 [FR] France .............................. 77 15109

[51] Int. Cl.³ .............................................. C08J 9/14
[52] U.S. Cl. .................................... 521/117; 521/121; 521/131; 521/136; 521/181; 525/489

[58] Field of Search ............... 521/136, 117, 181, 121; 525/489

[56] References Cited

U.S. PATENT DOCUMENTS

| | | | |
|---|---|---|---|
| 3,870,661 | 3/1975 | Crook et al. | 521/136 |
| 3,872,033 | 3/1975 | Boden et al. | 521/136 |
| 3,998,765 | 12/1976 | Novak et al. | 521/136 |

*Primary Examiner*—Morton Foelak
*Attorney, Agent, or Firm*—Bacon & Thomas

[57] ABSTRACT

The present invention relates to a process for the preparation of phenol-formaldehyde foams by mixing a resol phase having a viscosity of between 8 and 60 poises and a novolac phase comprising a true novolac, a blowing agent, phenolsulphonic acid and, optionally, phenol, the relative amounts of resol phase and of novolac phase being such that the resol phase represents 45 to 75% by weight of the mixture.

6 Claims, No Drawings

PROCESS FOR THE PREPARATION OF PHENOL-FORMALDEHYDE FOAMS

This is a continuation, of application Ser. No. 899,822, filed Apr. 25, 1978, now abandoned.

The present invention relates to a new process for the manufacture of phenol-formaldehyde foams and to the foams obtained in accordance with this process.

An earlier patent application has described a process for the manufacture of phenol-formaldehyde foams which consists of mixing, in a "mixing head", and at a temperature of between 15° and about 65° C.:

A homogeneous resol phase having a viscosity of between 200 and 250 poises at 20° C.; and an anhydrous novolac phase which forms a true solution and comprises methylene chloride (as a blowing agent), a phenolsulphonic acid (as a catalyst) and a novolac resin.

It has now been found that in order to obtain phenol-formaldehyde foams which are very homogeneous throughout their volume, using a technique such as that described above, it was very desirable to use a homogeneous resol phase having a markedly lower viscosity; on the other hand it has been found, very surprisingly, that the viscosity of the novolac phase had relatively little effect on the "homogeneity" of the foams obtained.

Hence, according to the present invention, there is used a homogeneous resol phase which has a viscosity of between about 8 and about 60 poises (the viscosity being measured at 20° C.) and which has a solids content of between 70 and 95% by weight, the resol contained in the said phase having been obtained by polycondensation, by means of a basic catalyst, of a mixture of phenol and formaldehyde in a molar ratio of 1:1.5 to 1:9.

It will be recalled that resol is generally obtained by mixing phenol and an aqueous formaldehyde solution in a reactor in such a way as to give suitable proportions of phenol and formaldehyde; the mixture is then heated to the boil and the basic catalyst (for example sodium hydroxide) is slowly introduced into it; boiling is continued for a certain time and then, after cooling, the mixture is neutralised with an acid (for example acetic acid). Using such a known method of preparation it is possible to adjust the viscosity (all viscosities given in the present text are BROOKFIELD viscosities) of the resol phase either by altering the duration of condensation or by altering the molar ratio of phenol/formaldehyde or by altering the water content of the phenol phase, or by adding a little methanol.

The solids content of the resol phase is determined by drying 4 g of the said phase, weighed into a dish, in a ventilated oven heated to 140° C., for 3 hours. The ratio of the amount, in grams, of product remaining in the dish and the 4 g initially weighed represents the solids content. This solids content is expressed in % of the initial product.

This resol phase can contain a surface-active agent which affects the uniformity of the foam obtained. Preferably Cemulsol B is used, at the rate of 2 parts by weight per 98 parts by weight of initial resol phase. This resol phase can also if desired, contain a small amount, which can range up to 10% by weight, of methanol, which serves the purpose of improving the shelf life of the said resol phase. This addition interestingly leads to a reduction in the viscosity of the resol phase. Thus, with a resol having a viscosity of 30 poises at 20° C., the viscosity is lowered to 8 poises after adding 6 parts of methanol to 94 parts of resol.

It will be noted that the resols used contain more than the necessary amount of formaldehyde because they are obtained from 1.9 to 3 mols of formaldehyde per mol of phenol; hence, in particular for the highest formaldehyde/phenol ratios (for example between 2.5 and 3), an excess of formaldehyde is present which can manifest itself in the irritant odour of this product in this latter case, it can be desirable to block this excess formaldehyde by adding to the resol phase a product such as urea ammonia, sodium sulphite or an oxidising agent.

According to the invention, a homogeneous and anhydrous novolac phase is used, the viscosity of which can vary within a wide range and can for example (measured at 20° C.) be between about 5 and about 300 poises, and which contains:

from 10 to 30% by weight of a blowing agent and
from 70 to 90% by weight of a mixture which comprises
a true novolac resin obtained by polycondensation, by means of an acid catalyst, of a mixture of phenol and formaldehyde in the molar ratio of 2:1 to 6:1,
optionally free phenol representing at most 30% by weight of the said novolac phase, and
phenolsulphonic acid, used as a catalyst, the amount of this acid, in the said novolac phase, being between 5 and 10% by weight, relative to the total weight of the whole of the mixture of resol phase plus novolac phase.

Furthermore, the relative amounts by weight of the resol phase and of the novolac phase used during mixing are such that the resol phase represents 45 to 75% by weight relative to the weight of the final mixture.

It will be recalled that novolac resins are generally obtained by mixing suitable relative amounts of phenol and of an aqueous formaldehyde solution in a reactor; the mixture is heated to the boil and a suitable amount of an acid catalyst (for example sulphuric acid) is added thereto; boiling is continued for a certain time, the mixture is then cooled, the water which it contains is removed, for example by aziotropic distillation by means of the excess phenol present in the mixture. The anhydrous true novolac thus obtained is converted to a novolac phase which can be used according to the invention, by adding:

phenolsulphonic acid, which acts as a catalyst for the production of the eventual foam,
phenol, which can be used for diluting the novolac phase and
a blowing agent.

In cases where, during the mixing of the resol and novolac phases, substantially equal amounts (for example from 45 to 55% by weight) of the two phases are used, the said novolac phase preferably comprises:
60 to 70% by weight of true novolac resin,
10 to 15% by weight of phenolsulphonic acid and
16 to 23% by weight of a blowing agent.

In cases where, during the mixing of the resol and novolac phases, substantially different amounts of these two phases are used, for example 65 to 75% by weight of resol phase per 35 to 25% by weight of novolac phase, the said novolac phase preferably comprises:
50 to 60% by weight of a "novolac resin" consisting of a mixture of 40 to 90% by weight of a true novolac resin obtained by polycondensation, by means of an acid catalyst, of a mixture of phenol and formaldehyde in a molar ratio of between 2:1 and 6:1, and 60 to 10% by weight of phenol, 20 to 30% by weight of phenolsulphonic acid and 16 to 23% by weight of a blowing agent.

In all the cases a blowing agent can be methylene chloride, chloroform, trichloroethylene or 1,1,1,-trichloroethane; it is also possible to use a mixture of these chlorinated products with one another or a mixture of at least one these products with ethyl alcohol. It is preferred to use mixtures of trichloroethane and ethanol and more particularly, amongst these mixtures, a mixture which comprises 40 parts by weight of ethanol per 60 parts by weight of trichloroethane. It will be noted that, compared to trichloroethane used by itself, such a mixture gives a novolac phase of lower viscosity, whilst ethanol, used by itself, does not make it possible to obtain a suitable foam.

One or other of the two phases used to carry out the invention can contain a surface-active agent which, as is known in the technique of manufacture of phenol-formaldehyde foams, has an effect on the uniformity of the cells which are formed.

The foam is prepared by mixing the two phases defined above and spraying the mixture thus produced onto the surface or into the enclosed space where the foam forms by natural and spontaneous change in the said mixture. The relative amount of the two phases are substantially identical, that is to say, for example, each phase represents between 45 and 55% of the mixture.

The temperature at which the mixing of the two phases is carried out is of importance with regard to the properties of the finished product; it has been found, according to the present invention, that the said temperature must be between 15° and 65° C. It is furthermore not necessary for the two phases to be heated to the same temperature when they are mixed; on the contrary, it has been found that it was often desirable that the temperature of the novolac phase (the phase containing the catalyst) should be a few degrees higher than the temperature of the resol phase.

The residence time of the mixture (inside the mixing head) can vary from about 5 seconds to about 1 minute 30 seconds; it depends of course on the reactants themselves and on the temperature at which the mixture is produced. It is necessary to regulate the residence time of the mixture in the "mixing head" so that the phenomenon of expansion of the foam takes place either when the said mixture issues from the said "head", or a short time afterwards.

It has been found, and this is one of the aspects of the invention, that on varying the relative amounts of resol phase and of novolac phase during mixing, all other things remaining the same, it is possible to exert a certain control on the properties of the foam obtained and especially its density.

The non-limiting examples which follow illustrate the invention.

EXAMPLE 1

Preparation of the resol phase

Phenol and formaldehyde are introduced into a reactor equipped with a stirring device, heating device and a cooling device. The mixture is heated to 50° C. and at this temperature sodium hydroxide (in the form of a 48% strength sodium hydroxide solution) is introduced. The reaction is exothermic and the temperature rises to the boil, which is reached in about 30 minutes. The mixture is then left to react at this temperature for a certain time; thereafter it is cooled to 50° C. by distillation of water in vacuo; it is neutralised to a pH of about 7 using 50% strength acetic acid and the amount of water required to leave a homogeneous resol phase of the desired viscosity is then distilled off. The resol phases as described in Table I below were obtained in this way.

The resin obtained no longer contains free phenol; its reactivity (°C./min) is measured by diluting 100 g of resin with 10 g of ethyl alcohol at 20° C., adding 10 cm$^3$ of 50% strength H$_2$SO$_4$ in the course of one minute, whilst mixing, placing the whole in an adiabatic container and recording the change in temperature as a function of time.

The phase R$_{10}$ contains 6% by weight of methanol, which was added after the end of the condensation.

It has been found that in general the resol phases which are richest in formaldehyde (formaldehyde/phenol ratio 2.2 to 3) are the most valuable for carrying out the invention even though, in the case of certain of these phases, a certain amount of formaldehyde is liberated during the formation of the foam.

The resol phase used in the examples which follow is obtained by adding 2% by weight of a surface-active agent (Cemulsol B) to the resols described.

EXAMPLE 2

Preparation of a novolac resin 4,700 g (50 mols) of phenol at 50° C., and 25.2 g of oxalic acid dihydrate and 612 g (10 mols) of 49% strength formaldehyde are introduced into a 6 liter reactor equipped with a temperature and pressure regulating system, a mechanical stirrer, a distillation column, a separator and a reflux column. The temperature is raised linearly from 50° to 114° C. reaching reflux in about 30 minutes.

After heating the mixture for a period of about 20 minutes the water is removed under atmospheric pressure by dehydration at a temperature below 180° C. The novolac is then heated in vacuo so as to remove the excess free phenol which it contains; this distillation of the phenol is never complete (for example the process is carried out under the vacuum provided by a water pump) and most frequently from 1.5 to 5% of free phenol remains in the resin; this is not important because, on the one hand, the free phenol can easily be "determined" and, on the other hand, according to the invention the phenol itself can act as a product which serves to adjust the viscosity of the novolac phase and for this reason it may be desirable to add back free phenol so that the amount of free phenol reaches up to 30% by weight relative to the novolac.

The base novolacs N 1, N 2 and N 3, of which the characteristics are given in Table II below, were obtained in this way.

The novolac phases are prepared as follows: a novolac resin, described above, after having been heated to about 50° C. in order to fluidise it, is introduced into a container equipped with a stirrer, a temperature probe and a condenser, the desired amount of acid catalyst (this catalyst being a sulphonic acid containing an aromatic nucleus) is then added, if appropriate after having heated the catalyst, and thereafter, whilst the mixture is at about 50° C., the blowing agent (or the mixture of blowing agents according to the invention) is added slowly whilst maintaining or slowly reducing the temperature; the mixture is stirred for a period of several minutes.

The novolac phases described in Table III below were obtained in this way.

EXAMPLE 3

Preparation of another true novolac resin and of various novolac phases 4,700 g (50 mols) of phenol at 50° C. and 918 g (15 mols) of 49% strength formaldehyde are introduced into a 6 l reactor equipped with a temperature and pressure regulating system, a mechanical stirrer a distillation column, a separator and a reflux column. 25.2 g of oxalic acid dihydrate are added to this mixture, heated to 60° C. The temperature is raised linearly from 60° C. to 114° C. (the reflux temperature) in about 30 minutes.

After heating the mixture for a period of about 20 minutes, the water is gradually removed under atmospheric pressure at a temperature below 180° C. The novolac is then heated in vacuo, so as to remove from it the excess phenol contained therein; the content of phenol present in the novolac phase can in this way be controlled precisely.

In this way it is possible to obtain a true novolac resin which has the following characteristics:
phenol content: about 2%
mean molecular weight: 265.

Increasing amounts of phenol were added to this true novolac resin so as to produce novolac resins (phenol being considered here as being the simplest of the true novolac resins) having various viscosities. Novolac phases which can be used in the process according to the invention are then produced by adding 27.3 parts of phenolsulphonic acid and 19.1 parts of a blowing agent which is a mixture of 60% of trichloroethane and 40% of ethanol, the remainder of the phase (namely 53.6 parts) representing the novolac resin, that is to say one of the mixtures of true novolac and phenol mentioned in the table below.

| Reference | Viscosity of the novolac phase | | |
|---|---|---|---|
| | % of true novolac resin in the novolac phase | % of phenol in the novolac phase | Brookfield viscosity (poises at 20° C.) |
| A | 48.6 | 5 | 290 |
| B | 43.6 | 10 | 85 |
| C | 38.6 | 15 | 25 |
| D | 33.6 | 20 | 15 |
| E | 28.6 | 25 | 9.2 |
| F | 23.6 | 30 | 4.8 |

EXAMPLE 4

Preparation of foams using resol and novolac phases in substantially identical proportion The stable solutions (the resol phase, on the one hand, and the novolac phase, on the other) are pumped, and fed into a mixing head. The relative proportions of the two solutions are about 50/50 by weight. Mixing takes place at ambient temperature or at slightly higher temperature; the residence time in the mixing head is less than 60 seconds. The mixture is then sprayed into a container where it starts to expand. In this way, foams having a good structure (regular cell formation, cell sizes approximately between 0.1 and 1 mm) are obtained.

The examples carried out are summarised in Table IV below.

EXAMPLE 5

In this example, as well as in the examples which follow, foams were produced by mixing different amounts of the resol and novolac phases, namely 70% of resol phase per 30% by weight of novolac phase.

70% by weight of the resol phase as obtained in Example 1, together with 30% by weight of one of the novolac phases (A, B, C, D, E and F) obtained according to Example 3 are admitted into a mixer in which the residence time is 30 seconds. The two phases are initially at a temperature of 23° C. The results given in Tables V to VIII below were obtained; these relate, on the one hand, to the blowing characteristics and, on the other hand, to the characteristics of the foam obtained.

Table V provides the results obtained with the resol phase $R_5$, Table VI with the resol phase $R_3$, Table VII with the resol phases $R_1$ and $R_2$ and Table VIII with the resol phases $R_2$ and $R_3$, containing a small amount of urea.

In all the cases, the foams obtained had a regular cell structure and did not exhibit shrinkage.

EXAMPLE 6

The process described in Example 5 was used, but employing the resol phase $R_9$ in place of the resol phase $R_5$. After reaction between this resol phase $R_9$ and the novolac phase D, the foam obtained had a specific gravity, in the body of the material, of 70 kg/m$^3$.

EXAMPLE 7

The process described in Example 5 was used, but employing the resol phase $R_{10}$ in place of the resol phase $R_5$. After reaction between this resol phase $R_{10}$ and the novolac phase D, the foam obtained had a mean specific gravity of 50 kg/m$^3$ and a specific gravity, in the body of the material, of 21 kg/m$^3$.

TABLE I

| Resol | Molar ratio phenol/formaldehyde/sodium hydroxide | Heating time in minutes | Solids content % | Resols obtained | |
|---|---|---|---|---|---|
| | | | | Viscosity poises at 20° C. | Reactivity °C./min |
| $R_1$ | 1/1.6/0.05 | 5 | 80 | 52 | 98° C./14 min |
| $R_2$ | 1/1.6/0.05 | 10 | 78.5 | 56 | 67° C./40 min |
| $R_3$ | 1/1.9/0.05 | 10 | 75.8 | 56 | 65° C./40 min |
| $R_4$ | 1/1.9/0.05 | 20 | 75.8 | 56 | *54° C./70 min |
| $R_5$ | 1/2.2/0.05 | 10 | 79.5 | 58 | 65° C./35 min |
| $R_6$ | 1/2.5/0.05 | 15 | 78.3 | 57 | *44° C./65 min |
| $R_7$ | 1/2.5/0.05 | 10 | 79 | 60 | *58° C./35 min |
| $R_8$ | 1/3/0.05 | 5 | 80 | 60 | *36° C./50 min |
| $R_9$ | 1/1.5/0.025 | 20 | 75 | 30 | 100° C./10 min |
| $R_{10}$ | 1/1.5/0.025 | 30 | 72.9 | 8 | 116° C./5 min |

*The reactivity measurements preceded by an asterisk were carried out using 10% strength H$_2$SO$_4$

TABLE II

| Novolac | Molar ratio phenol/formaldehyde/oxalic acid | Number-average molecular weight Mn | % residual phenol |
|---|---|---|---|
| N 1 | 1/0.4/0.004 (P/F = 2.5) | 300 | 1.9 |
| N 2 | 1/0.3/0.004 (P/F = 3.33) | 260 | 1.9 |
| N 3 | 1/0.2/0.004 (P/F = 5) | 235 | 1.9 |

TABLE III

| Novolac phases | No. | Starting novolacs Amount % | Comprising True novolac | Phenol | Phenolsulphonic acid, % | (blowing agent) | | Viscosity, poises at 20° C. |
|---|---|---|---|---|---|---|---|---|
| | | | | | | CH$_2$Cl$_2$, % | | |
| PN 1 | N 3 | 69.26 | 64.16 | 5.1 | 13.46 | 17.3 | | 60 |
| PN 2 | N 3 | 69.26 | 64.16 | 5.1 | 13.46* | 17.3 | | 56 |
| | | | | | | CHCl$_3$ % | C$_2$H$_5$OH % | |
| PN 3 | N 3 | 67.4 | 63.7 | 3.7 | 13.1 | 13.6 | 5.9 | 28 |
| PN 4 | N 3 | 68 | 61 | 7 | 12 | 17 | 3 | 28 |
| PN 5 | N 3 | 66.39 | 62.75 | 3.64 | 12.91 | 17.21 | 3.49 | 38 |
| PN 6 | N 3 | 67.4 | 63.7 | 3.7 | 13.1 | 16.25 | 3.25 | 45 |
| PN 7 | N 3 | 69.2 | 65.4 | 3.8 | 13.5 | 13.95 | 3.35 | 56 |
| | | | | | | TCE** % | Ethanol % | |
| PN 8 | N 3 | 67.4 | 56.4 | 11 | 13.1 | 11.7 | 7.8 | 29 |
| PN 9 | N 3 | 67.4 | 56.4 | 11 | 13.1 | 9.75 | 9.75 | 18 |
| PN 10 | N 3 | 67.4 | 56.4 | 11 | 13.1 | 13.65 | 5.85 | 35 |
| PN 11 | N 2 | 67.4 | 52.15 | 15.11 | 13.1 | 11.7 | 7.8 | 28 |
| PN 12 | N 1 | 67.4 | 48.9 | 18.5 | 13.1 | 11.7 | 7.8 | 28 |
| PN 13 | N 2 | 67.4 | 55.4 | 12 | 13.1 | 11.7 | 7.8 | 51 |
| PN 14 | N 1 | 67.4 | 47.4 | 20 | 13.1 | 11.7 | 7.8 | 18 |
| PN 15 | N 2 | 67.4 | 51.4 | 16 | 13.1 | 11.7 | 7.8 | 24 |

*in the form of an 83.4% strength solution in ethanol
**TCE 1,1,1-trichloroethane

TABLE IV

| Foaming experiment No. | Resol phase used | Novolac phase used | Temperature of the mixture, °C. | Residence time, sec | Maximum temperature during foaming °C. | Mean specific gravity of the foam obtained g/l |
|---|---|---|---|---|---|---|
| E 1 | R 7 C | PN 1 | 20 | 20 | 93 | 21 |
| E 2 | R 6 C | PN 1 | 22 | 20 | 94 | 27 |
| E 4 | R 7 C | PN 2 | 23 | 20 | 95 | 27.2 |
| E 5 | R 7 C | PN 7 | 22 | 20 | 95 | 34.3 |
| E 6 | R 7 C | PN 3 | 22 | 20 | 98 | 37.5 |
| E 7 | R 7 C | PN 6 | 22 | 20 | 97 | 34.3 |
| E 8 | R 7 C | PN 4 | 22 | 20 | 94 | 28 |
| E 9 | R 7 C | PN 4 | 30 | 20 | 94 | 26.5 |
| E 10 | R 7 C | PN 5 | 22 | 20 | 94 | 31.2 |
| E 11 | R 5 C | PN 9 | 23 | 30 | 94 | 44 |
| E 12 | R 5 C | PN 8 | 23 | 30 | 94 | 42.6 |
| E 13 | R 5 C | PN 10 | 23 | 30 | 94 | 40.5 |
| E 14 | R 5 C | PN 12 | 22 | 30 | 94 | 46 |
| E 15 | R 5 C | PN 11 | 22 | 30 | 94 | 44 |
| E 3 | R 8 C | PN 1 | 23 | 20 | 92 | 25 |

TABLE V

| | | Foaming characteristics | | | Characteristics of the foam obtained | | Specific gravity (kg/m$^3$) | |
|---|---|---|---|---|---|---|---|---|
| Resol phase | Novolac phase | Start of foaming (sec) | End of foaming (sec) | Heating (sec) | Weight (g) | Volume (cm$^3$) | Mean | In the body of the material |
| R$_5$ | A | 55 | 60 | 60 | 185 | 624 | 296 | 185 |
| R$_5$ | B | 55 | 65 | 85 | 180 | 990 | 181 | 106 |
| R$_5$ | C | 45 | 55 | 80 | 182 | 1520 | 120 | 60 |
| R$_5$ | D | 45 | 60 | 85 | 180 | 1491 | 120 | 50 |
| R$_5$ | E | 55 | 70 | 90 | 181 | 1904 | 95 | 40 |
| R$_5$ | F | 50 | 65 | 90 | 181 | 2280 | 79 | 34 |

TABLE VI

| | | Foaming characteristics | | | Characteristics of the foam obtained | | Specific gravity (kg/m$^3$) | |
|---|---|---|---|---|---|---|---|---|
| Resol phase | Novolac phase | Start of foaming (sec) | End of foaming (sec) | Heating (sec) | Weight (g) | Volume (cm$^3$) | Mean | In the body of the material |
| R$_3$ | A | 80 | 100 | 100 | 181 | 648 | 280 | 188 |
| R$_3$ | B | 80 | 105 | 110 | 178 | 1092 | 163 | 96 |
| R$_3$ | D | 70 | 90 | 95 | 180 | 1644 | 109 | 55 |
| R$_3$ | E | 80 | 105 | 110 | 178 | 1804 | 98 | 47 |
| R$_3$ | F | 85 | 105 | 110 | 182 | 2487 | 73 | 34 |

TABLE VII

| | | Foaming characteristics | | | Characteristics of the foam obtained | | | |
| | | | | | | | Specific gravity (kg/m$^3$) | |
| Resol phase | Novolac phase | Start of foaming (sec) | End of foaming (sec) | Heating (sec) | Weight (g) | Volume (cm$^3$) | Mean | In the body of the material |
| --- | --- | --- | --- | --- | --- | --- | --- | --- |
| R$_1$ | A | 85 | 110 | 120 | 170 | 2147 | 79 | 40 |
| R$_1$ | C | 55 | 105 | 115 | 170 | 2713 | 62 | 28 |
| R$_1$ | F | 55 | 75 | 85 | 165 | 4154 | 39 | 19 |
| R$_2$ | A | 125 | 150 | 165 | 180 | 785 | 229 | 142 |
| R$_2$ | C | 130 | 150 | 180 | 180 | 1177 | 152 | 62 |
| R$_2$ | F | 120 | 150 | 180 | 181 | 2184 | 83 | 34 |

TABLE VIII

| | | Foaming characteristics | | | Characteristics of the foam obtained | | | |
| | | | | | | | Specific gravity (kg/m$^3$) | |
| Resol phase | Novolac phase | Start of foaming (sec) | End of foaming (sec) | Heating (sec) | Weight (g) | Volume (cm$^3$) | Mean | In the body of the material |
| --- | --- | --- | --- | --- | --- | --- | --- | --- |
| R$_2$ (+ 1% urea) | B | 145 | 165 | 190 | 181 | 1177 | 153 | 63 |
| R$_2$ (+ 1% urea) | D | 140 | 165 | 185 | 180 | 2076 | 87 | 35 |
| R$_2$ (+ 1% urea) | F | 120 | 150 | 170 | 180 | 2491 | 72 | 28 |
| R$_3$ (+ 2% urea) | A | 145 | 170 | 200 | 180 | 384 | 468 | 167 |
| R$_3$ (+ 2% urea) | C | 135 | 165 | 185 | 180 | 1709 | 105 | 48 |
| R$_3$ (+ 2% urea) | E | 120 | 140 | 160 | 179 | 2492 | 72 | 32 |

We claim:

1. Process for the preparation of phenol-formaldehyde foam which consisting of introducing a resol phase and a liquid anhydrous novolac phase into a mixer, mixing the resol phase and the novolac phase for a period of between about 5 and about 90 seconds to obtain a resin mixture, and subsequently spraying the resin mixture produced out of said mixer to obtain the foam, wherein the resol phase is homogeneous, has a viscosity, measured at 20°, of between 8 and 60 poises, and has a solids content of between 70 and 95% by weight, the resol contained in the said phase being obtained by polycondensation, by means of a basic catalyst, of phenol and formaldehyde in a molar ratio of between 1:1.5 and 1:3;

the liquid novolac phase is a homogeneous and anhydrous essentially uncured liquid mixture which has a viscosity, measured at 20° C., of between about 5 and about 300 poises and contains from 10 to 35% by weight of a blowing agent which is a halogenated hydrocarbon selected from the group consisting of methylene chloride, chloroform, 1,1,1-trichloroethane, trichloroethylene, dichloroethane and mixtures thereof or a mixture of said halogenated hydrocarbon with ethanol, and from 70 to 90% by weight of a mixture comprising a true novolac resin obtained by polycondensation, by means of an acid catalyst, of a mixture of phenol and formaldehyde in a molar ratio of 2:1 to 6:1, phenolsulphonic acid in an amount of between 5 and 10% by weight relative to the resin mixture of resol phase and novolac phase and optionally, free phenol representing at most 30% by weight of the novolac phase;

the relative amounts by weight of resol phase and of novolac phase being such that the resol phase represents 45 to 75% by weight of the resin mixture.

2. Process according to claim 1, wherein the novolac phase contains from 16 to 23% by weight of a blowing agent, from 10 to 15% by weight of phenolsulphonic acid and from 60 to 70% by weight of a true novolac resin, and the proportion by weight of resol phase in the mixture is of the order of 50%.

3. Process according to claim 1, wherein the novolac phase contains from 16 to 23% by weight of a blowing agent, from 20 to 30% by weight of phenolsulphonic acid and from 50 to 60% by weight of a mixture containing 40 to 90% by weight of a true novolac resin and 60 to 10% by weight of phenol, and the proportion, by weight of resol phase in the mixture is between 65 and 75%.

4. Process according to claim 1, wherein the resol phase contains about 0.5 mol of urea per mol of free formaldehyde which it may contain.

5. Process according to claim 1, wherein the blowing agent is selected from amongst methylene chloride, chloroform, 1,1,1-trichloroethane, trichloroethylene, dichloroethane and the mixtures of these products.

6. Process according to claim 1, wherein the blowing agent is a mixture containing 40 parts by weight of ethanol per 60 parts by weight of trichloroethane.

* * * * *